July 14, 1970  SADAICHI KOMAKI ET AL  3,520,677
METHOD OF MANUFACTURING METAL BLANKS HAVING AN
ANISOTROPIC CRYSTALLINE STRUCTURE
Filed Sept. 23, 1966  6 Sheets-Sheet 1

INVENTORS
SADAICHI KOMAKI
SUSUMU MEGURO
SYOGI SUZUKI

BY *Stevens, Davis, Miller & Mosher*
ATTORNEYS

July 14, 1970  SADAICHI KOMAKI ET AL.  3,520,677
METHOD OF MANUFACTURING METAL BLANKS HAVING AN
ANISOTROPIC CRYSTALLINE STRUCTURE
Filed Sept. 23, 1966  6 Sheets-Sheet 2

INVENTORS
SADAICHI KOMAKI
SUSUMU MEGURO
SYOGI SUZUKI

BY Stevens, Davis, Miller & Mosher
ATTORNEYS

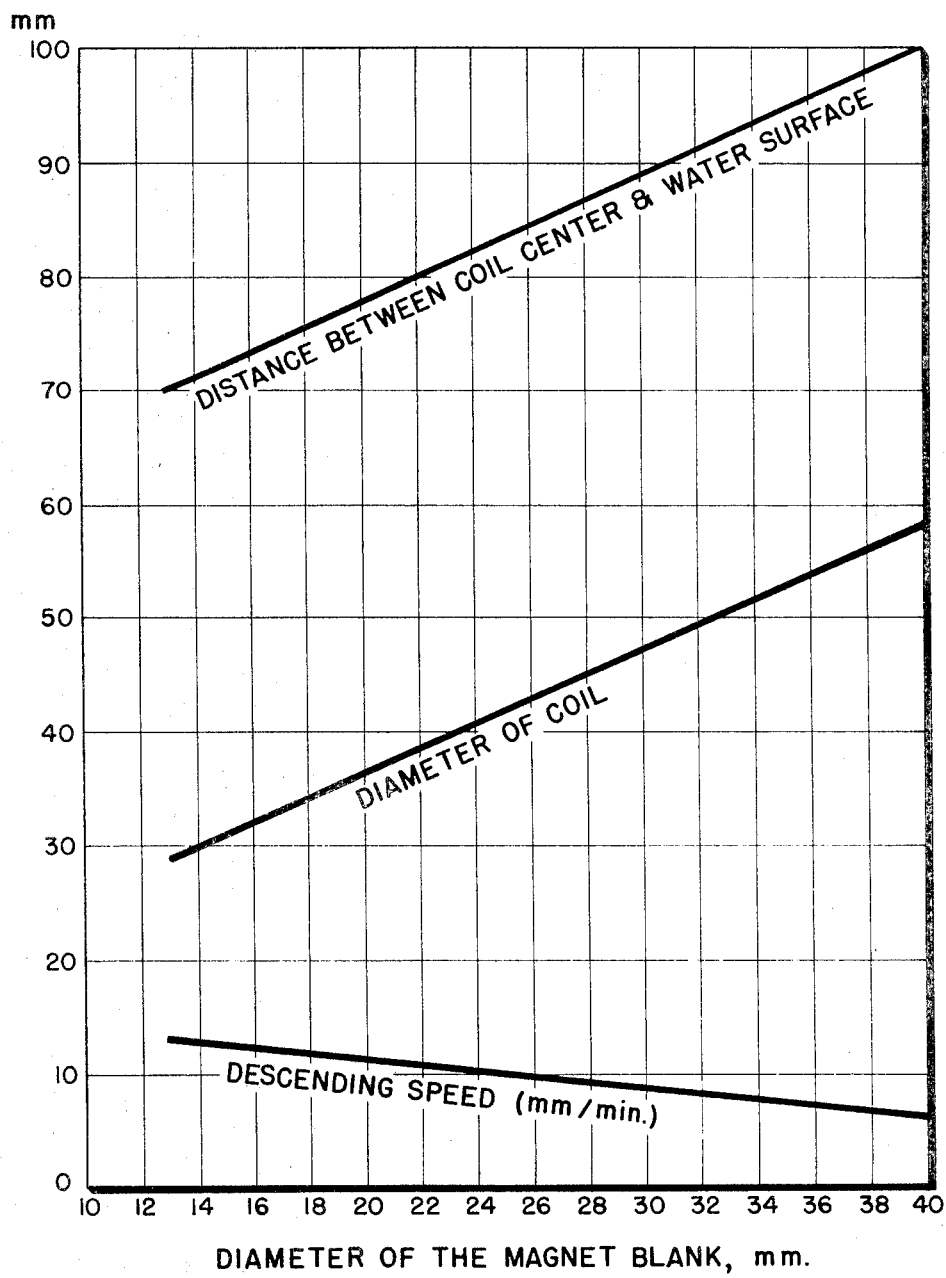

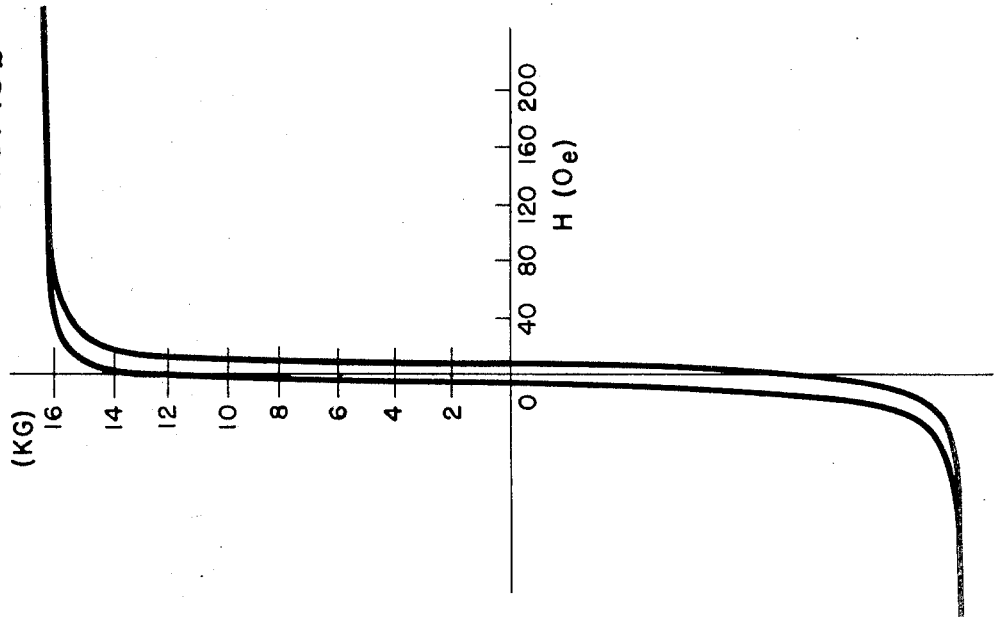
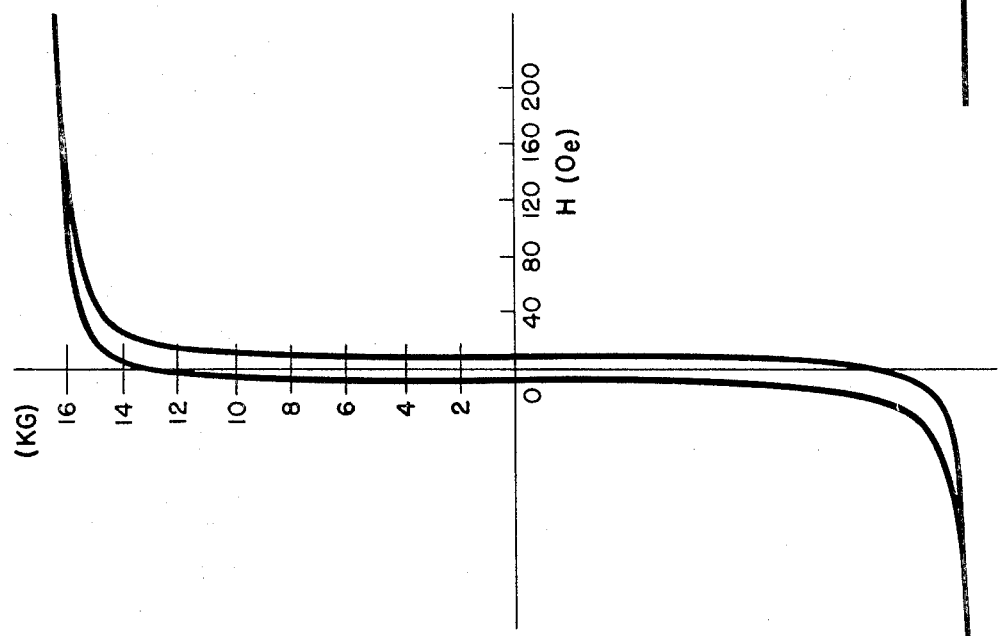
INVENTORS
SADAICHI KOMAKI
SUSUMU MEGURO
SYOGI SUZUKI

United States Patent Office 3,520,677
Patented July 14, 1970

3,520,677
METHOD OF MANUFACTURING METAL BLANKS HAVING AN ANISOTROPIC CRYSTALLINE STRUCTURE
Sadaichi Komaki, Susumu Meguro, and Syogi Suzuki, Tokyo, Japan, assignors to Sadaichi Komaki, Tokyo, Japan
Continuation-in-part of applications Ser. No. 186,209, Apr. 9, 1962, and Ser. No. 295,468, July 16, 1963, both of which are continuations-in-part of application Ser. No. 72,210, Nov. 28, 1960, This application Sept. 23, 1966, Ser. No. 581,655
Claims priority, application Japan, Oct. 5, 1960, 35/40,854; Dec. 30, 1961, 37/48,134
Int. Cl. C22d 7/00
U.S. Cl. 75—10         17 Claims

ABSTRACT OF THE DISCLOSURE

A method of manufacturing a non-magnetized metal blank having an anisotropic crystalline structure suitable for subsequent magnetization. Said method comprises passing a blank of magnetizable material through a heat area defined by an electromagnetic induction coil energized by an alternating current of frequency greater than 50 kilocycles per second to progressively melt the zones of the blank passing through said area, and thereafter passing said blank into a cooling liquid to progressively quench said blank whereby unidirectional cooling by heat transfer into said liquid occurs to produce substantially completely unidirectionally oriented crystals in said blank.

---

This application is a continuation-in-part of applications Ser. No. 186,209, filed Apr. 9, 1962, now abandoned, and Ser. No. 295,468, filed July 16, 1963, now abandoned, both of which are continuations-in-part of application Ser. No. 72,210, filed Nov. 28, 1960, now abandoned.

The present application relates to a method of manufacturing a non-magnetized metal blank having an anisotropic crystalline structure suitable for subsequent magnetization.

It is known that a magnet having improved magnetic properties along certain directions may be manufactured by a method in which a magnet blank is subjected to the action of a magnetic field while it is cooling from a temperature above the Curie point. By subsequently magnetizing the magnet in the same direction as the direction of the magnetic field applied during the cooling, a magnet is obtained which has a high (BH) max. It is believed that the process of cooling in a magnetic field results in reorientation of the magnetic domains in the blank.

It is known that a further improvement in magnetic properties is obtained if the process of cooling in a magnetic field is applied to a blank in which the crystals are oriented in such a manner that a (100) direction lies parallel to the direction of the magnetic field applied during the cooling process.

It is therefore desirable as a preliminary step to orient the crystalline structure in the blank parallel to the direction which is intended to be the direction of magnetization; it is particularly desirable to provide a blank in which the columnar crystals are oriented substantially completely in one direction.

Various methods have been proposed for manufacturing a blank having an anisotropic crystalline structure, but none of these methods have been entirely successful on an industrial scale in providing a blank having unidirectional columnar crystal orientation. The known methods include casting molten magnetizable material into a mold and controlling the direction of heat dissipation in a given direction by various means. In the process of Ebeling U.S. Pat. No. 2,578,407, metal chill plates made of soft steel are inserted in the mold so as to form the bottom of each cavity, and the molten magnetizable material is cast in the mold. Thus, the molten material is brought into contact with the chill plate so that the material is cooled in the direction starting from the chill plate to form columnar crystals orientated in a direction perpendicular to the face of the chill plate. However, in practice these orientated columnar crystals do not form more than 60–65% of the blank; the remainder of the blank is composed of crystals oriented in random directions some of which are at right angles to the preferred direction. This method involves considerable hand labor and due to the attendant wear and tear the useful life of the chill plates is relatively short. Consequently, along with the labor costs, replacement and maintenance costs are high.

In the production of bodies of ferromagnetic material having high magnetic permeability it has been customary to carry out a cold rolling process involving excessively high pressure followed by a quenching operation and a tempering process. This may be used in conjunction with a chill plate molding process as described above. However even by the use of the cold rolling process it has not been possible to obtain a magnetic body having more than 90% of crystalline anisotropic character.

It is an object of the present invention to provide a method of manufacturing a blank wherein the orientation of the columnar crystals is substantially entirely along the desired single axis without any of the random crystal structure resulting from the chill plate mold casting technique.

It is a further object of the invention to manufacture a blank consisting substantially of columnar crystals orientated in a given direction in an extremely simple and considerably less expensive manner.

It is a further object to provide a method of manufacturing blanks as aforesaid which is suitable for production on an industrial scale.

It is an object of the invention to provide a blank capable of magnetization to produce permanent magnets having a maximum energy of the order of $8.9 \times 10^6$ on a mass production scale.

It is a further object to provide a method of manufacturing blanks suitable for production of magnetic alloy of high magnetic permeability which method may be carried out after a press rolling process omitting the use of excessively high pressure and relying merely on hot press rolling at a temperature lower than that which destroys the original crystalline structure.

The present invention is applicable to a broad range of magnetizable materials comprising at least one element selected from iron, nickel, cobalt, silicon, manganese, and molybdenum. The magnetizable materials include ferromagnetic materials characterized by a high permeability in the range 5.000–1,000,000 oersted and low coercive force in the range 1–0.002 oersted. Suitable ferromagnetic materials include alloys of iron with nickel or cobalt with or without other elements such as silicon, aluminum, molybdenum and chromium. The invention is also applicable to alloys suitable for magnetization to form permanent magnets, i.e., materials characterized by residual magnetism in the range 8,000–15,000 gauss and high coercive force in the range 600–1,500 oersted. In particular the method may be applied to permanent magnetizable alloys containing cobalt, nickel, aluminum and the remainder principally iron. Other elements which may be present in the alloy include copper, titanium, silicon, niobium, tungsten, cadmium, sulfur, barium, and potassium. For example, an alloy may suitably contain about 13–40% of cobalt, 10–20% of nickel, 6–13% of aluminum, 0–9% of copper, 0–8% of titanium, 0–3% of silicon, 0–5% of niobium, and the remainder iron. Particularly suitable materials are the iron-cobalt-nickel-aluminum alloys known as "Alnico" alloys particularly the iron alloy containing 16–30% cobalt, 12–20% nickel, 6–11% aluminum, and 0–7% copper.

The present invention provides a method of manufacturing a non-magnetized metal blank having an anisotropic crystalline structure suitable for subsequent magnetization which comprises passing at a constant speed a blank of magnetizable material under non-oxidizing conditions through a heat area defined by an electromagnetic induction coil energized by an alternating current of frequency greater than 50 kilocycles per second to progressively melt the zones of the blank passing through said area, and thereafter passing said blank at the same constant speed into a cooling liquid to progressively quench said blank from the lower end thereof whereby unidirectional cooling by heat transfer into said liquid occurs to produce substantially completely unidirectionally oriented crystals in said blank.

In the most convenient mode of operation of the invention the electromagnetic induction coil is mounted with its axis vertical and the cooling liquid having a horizontal surface is disposed below the coil. The blank is then passed vertically downwardly through the coil and further vertically downwardly into the cooling liquid. This progressive heating and quenching is effective to change the crystal structure of the blank into a recrystallized structure wherein the crystals are vertically orientated, i.e., along the direction of quenching in the cooling liquid.

The disposition of the cooling liquid below the coil is particularly advantageous in that by vertical movement of either component the distance between the two can be varied. For a blank of any particular cross-sectional dimension there is an optimum distance between the coil and the cooling liquid. Thus, if the method of the invention is to be applied to magnet blanks of different diameter the distance between the coil center and the cooling liquid will vary in relation to the diameter of the blank. However for any particular blank the distance will be fixed and a constant gradient of temperature will be maintained between the heat area and the cooling liquid.

If the magnet blank is of non-circular cross section the "diameter" of the blank for the purposes of this specification and the attached claims is defined as the diameter of a circle circumscribing an area equal to the cross sectional area of the blank.

For a better understanding of the invention, reference is directed to the accompanying drawings in which:

FIG. 7 is a diagram showing the optimum relation between the diameter of the blank (as the abscissa) and three parameters (as ordinate): distance between the coil center and the liquid cooling surface (mm.); diameter of the induction coil (mm.); and descending speed of the blank (mm./min.);

Figure 12:
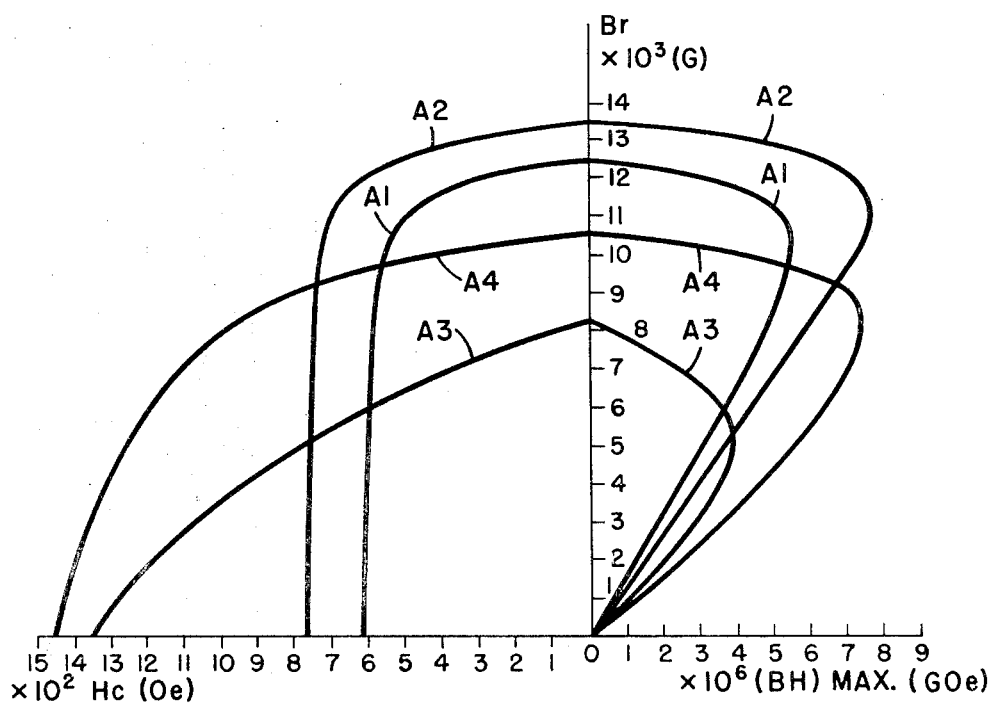
Figure 13:
Figure 16:
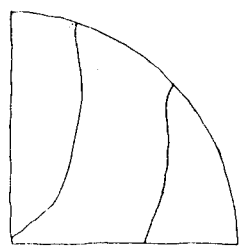
Figure 14:
Figure 17:
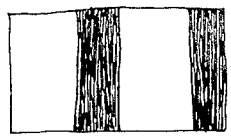
Figure 15:
Figure 18:
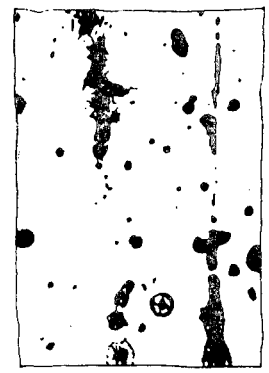

FIG. 12 presents BH curves of permanent magnets manufactured from conventional blanks as well as blanks produced by the method according to the invention;

FIGS. 13, 14 and 15 present views based on microphotographs taken on sectional plane surfaces of an alloy without treatment in accordance with the invention;

FIGS. 16, 17 and 18 present views based on microphotographs taken on sectional plane surfaces of the same alloy as FIGS. 13, 14 and 15 treated in accordance with the invention; and FIG. 19 is a diagram showing BH curves of magnets produced from blanks with and without treatment by the method of the invention.

Figure 1:
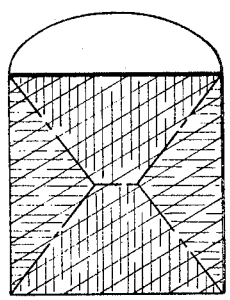
FIGS. 1 and 2 are vertical sections showing the crystal structure of blanks manufactured by conventional methods.
Figure 2:
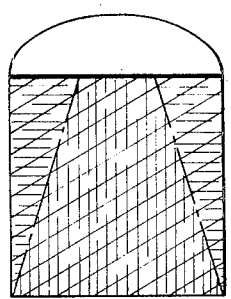

Referring to the drawings, FIG. 1 illustrates the X-shaped crystal structure of an alloy blank cast in a conventional mold and uniformly cooled through the four side walls of the mold. FIG. 2 shows the same form of blank manufactured by the chill plate procedure of Pat. No. 2,578,407 and having about 63% of the columnar crystal orientated in the vertical direction.

Figure 3:
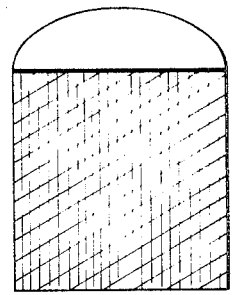
FIG. 3 is a vertical section showing the crystal structure of a blank manufactured by the method according to the invention.

Up to the present, this method of casting the magnet blanks using chill plates to control the direction of crystal growth in accordance with Pat. No. 2,578,407 is the best of the available industrial procedures. This method, however, is characterized by extremely high operating costs due to the substantial labor requirements and relatively short equipment life. Anisotropy of the columnar crystal shown in FIG. 2 is 60–65% only and the magnetic property thereof is not satisfactory due to the presence of columnar crystals also with axes extending in the transverse direction. FIG. 3 shows the same form of magnet made in accordance with the present invention in which the columnar crystal structure is orientated substantially entirely in the vertical direction.

The present invention is basically different from the conventional method wherein the heat stream is controlled during casting in order to obtain the columnar crystal structure. The present invention is intended to re-melt the magnetizable material so as to diminish the crystals orientated in directions not desired and make free these crystals, and subsequently effect quenching so as to rearrange the columnar crystals in a definite direction.

In one example of the method according to the invention an alloy suitable for forming a permanent magnet is melted and cast in a given mold to produce blanks of the desired shape and size. The purpose of this initial casting is not aimed at obtaining an anisotropic crystalline structure and may be carried out in a manner such as to minimize the loss of alloy material as scrap, rejects, etc. The conventional casting process, such as said mold process, shell mold process and lost wax process or the carbonic acid gas process, etc., may be applied so as to have an optimum yield of usable forms with minimum waste. If it is desired to produce a long bar by casting a centrifugal casting process may preferably be applied so as to improve the yield.

Figure 4:
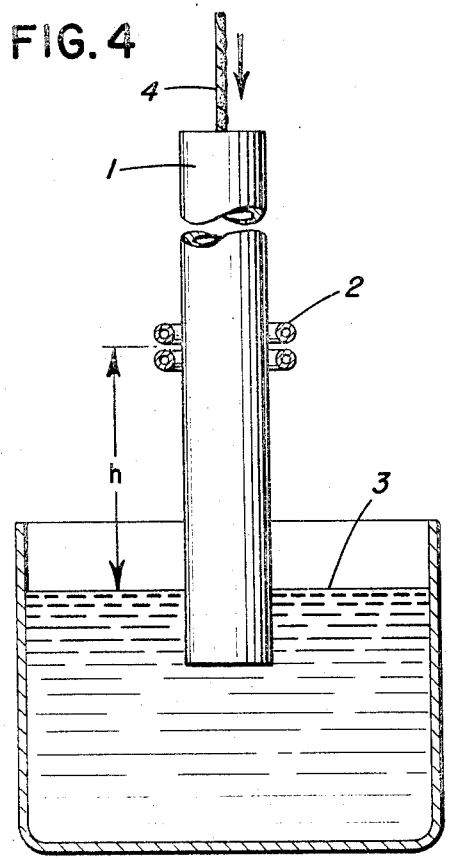
FIGS. 4 and 5 are generally diagrammatic views showing arrangements for carrying out the method according to the invention.

In FIG. 4 which is a diagrammatic representation of an arrangement suitable for carrying out the invention, 1 designates a body of magnetizable material, 2 shows a cylindrical coil which is connected to a source of high frequency current (not shown), 3 designates the cooling water disposed below the coil, 4 represents a cord for lowering the body of magnetizable material through the coil 2 and into the cooling water 3. The distance between the coil center and the cooling water level is shown by $h$.

Figure 5:
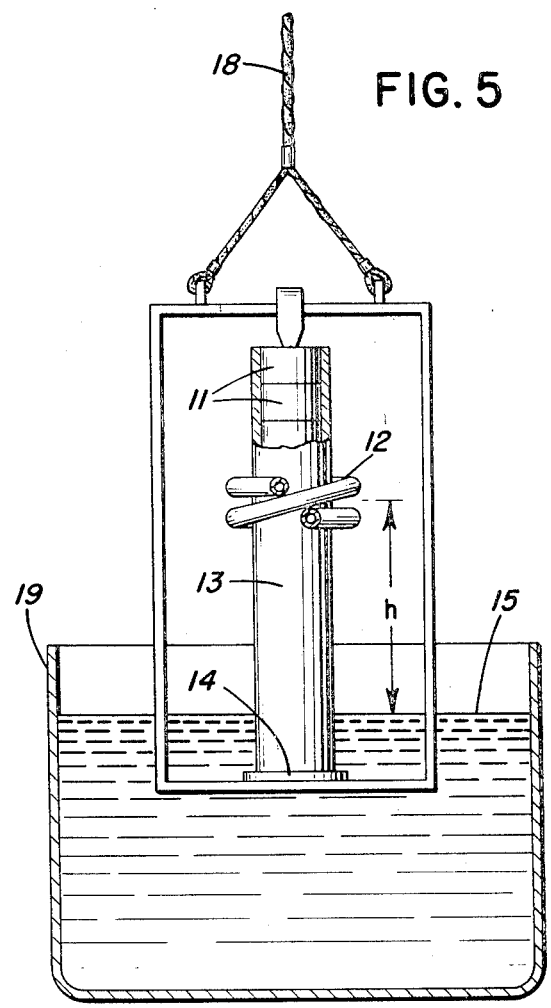

Referring to FIG. 5 which is a more detailed diagrammatic representation of one particular form of apparatus for carrying out the invention, a number of magnet blanks 11 which have been cast by any conventional method are inserted in a retaining vessel 13 such as a tube or sleeve of ceramic material. The thus filled retaining vessel is clamped in a supporting frame 16 and a disc-shaped base 14 serves to close the base of retaining vessel 13 and to support it within the frame. An inductive heating coil 12 is fixed in place independently of frame 16 and is connected to a source of high frequency current not shown. The coil 12 is constructed preferably of copper tubing through which water is caused to flow for the purpose of preventing overheating of the tubing. A body of cooling water 15 is disposed below the coil in a tank 19 provided with an inlet and outlet so as to circulate and replenish fresh water. The frame 16 is made of brass or like material such that it will not be heated by any magnetic field that may be induced therein. A metal pin 17 is provided for pressing the top of the tube 13 to hold it in place at right angles to the cooling water level. The frame 16 is provided with means 18 for lowering the blank-containing vessel 13 down through the coil 12 at a predetermined rate. Coil 12 is spaced above the water level in tank 19 a distance represented by $h$.

Figure 6:
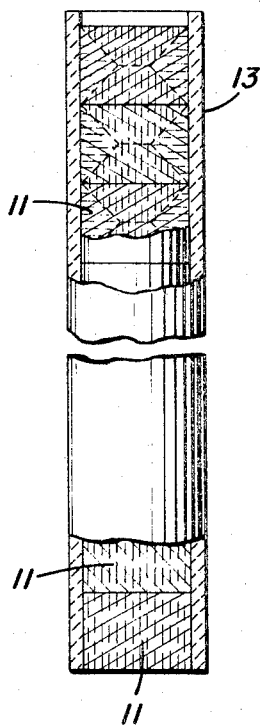
FIG. 6 is an enlarged view, partly in section, of a portion of FIG. 5.

FIG. 6 shows, partly in section, an enlarged view of the retaining vessel 13 wtih a plurality of identical blanks stacked one upon the other. The figure represents a sheath and enclosed blanks during the operation in which the lowermost blanks have been remelted and recrystallized in accordance with the invention while the upper blanks have not as yet been passed through the high-frequency heat area. It will be noted that the thus treated lower blanks show the orientated columnar crystal structure whereas the untreated upper blanks show the more or less random orientation of the original casting.

In an alternative mode of operation, molten metal may be cast directly in a sleeve or like retaining vessel and hardened to form a bar-shaped blank. Subsequently the blank together with the sleeve is inserted into the heat area and cooled as described above. The columnar crystals formed are in parallel with the axis of the bar-shaped blank.

FIG. 7 is a diagram summarizing the results of experiments carried out with blanks of different diameter. The optimum conditions for carrying out the invention were determined in each case by subjecting the treated blank to cooling in a magnetic field and subsequent magnetization and measurement of the maximum energy of the magnet produced. The aim of the experiments was to determine the conditions for operation of the invention which would result in the highest value of maximum energy for the magnet ultimately produced after the subsequent conventional steps.

FIG. 7 shows the diameter D of the blank in millimeters as abscissa. The optimum distance $h$ between the coil center and the cooling water level is shown in millimeters. The optimum value of $h$ is shown to be about $(D+57)$ mm. For beneficial operation of the invention it is preferred that $h$ be in the range $(D+47)$ to $(D+67)$ mm.

The optimum value for the diameter of the heating coil is shown to be about $(D+17)$ mm. For beneficial operation of the invention it is preferred that the diameter of the coil be in the range $(D+7)$ to $(D+27)$ mm.

The optimum value for the descending speed of the blank through the coil and into the cooling liquid is shown to be about $(17-0.3D)$ mm. per minute. For beneficial operation of the invention it is preferred that the descending speed be not greater than 20 mm. per minute.

Figure 8:
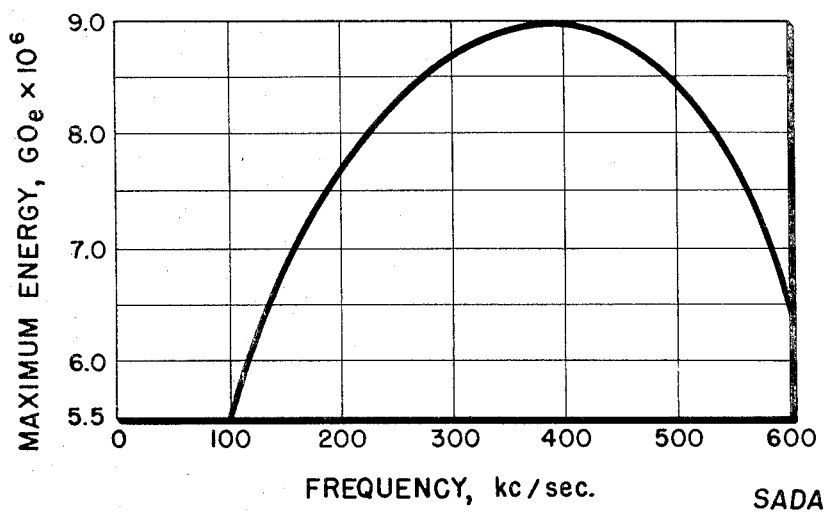
FIG. 8 is a diagram showing the relation between the frequency of the current in the induction coil and the maximum energy of the magnet ultimately produced from the blank.

FIG. 8 shows the relation between the frequency of the current used to create the heat area and the maximum energy of the magnet ultimately produced. The optimum frequency is shown to be about 400 kc./sec. For beneficial operation of the invention it is preferred that the frequency be in the range 150–600 kc./sec.

The blank passing through the heat area is melted in zones. Preferably the molten zone at any one time has a vertical dimension in the range 0.5D to 1.5D where D is the diameter of the blank.

The cooling liquid is most conveniently maintained at a temperature of less than 45° C., preferably in the range 10–25° C.

The present invention may conveniently be carried out utilizing a plurality of magnetizable blanks in vertical succession enclosed in a retaining vessel. In this case it is desirable to use blanks having a coating of metal oxide film which inhibits melting together of the blanks during passage through the heat area. Frequently blanks cast by conventional processes will have such an oxide film. If the blanks do not have an oxide film they may be subjected to oxidation before treatment in accordance with the invention.

On the other hand, it is desirable to protect the blanks from excessive oxidation during the process of the invention. Most conveniently the blanks or a plurality of blanks are enclosed by a sleeve or sheath which also serves to hold the blank in shape while zones are being progressively melted and quenched. However, if some other form of retaining vessel such as a net is used, non-oxidizing conditions may be maintained by carrying out the process in an atmosphere of nitrogen or other oxygen-free gas.

If a sleeve or sheath is used, the base must be enclosed. This may be done by a plate as shown in FIG. 5, or alternatively a blank at the bottom of the sleeve may be used, this blank being subsequently rejected particularly if it has been exposed to air or oxygen.

It is most convenient to use a sheath of heat resistant non-magnetic ceramic material which can subsequently be destroyed to release the treated blank or blanks. Preferably the sheath is made of a special ceramic composition, such for example as chamotte, mullite, alumina (particularly as "Alundum") or magnesia which will resist the strain when subjected to the rapid cooling incident to the quenching step of this process. Such materials should have a heat resistant factor more than S 32 and a porosity of 20–30% as well as a uniform heat conductivity. This material is freed of iron and then molded into the desired form and subsequently dehydrated in air or in a suitable drying furnace. The sleeve form is then dried and coated on the inside wall surface thereof with a special thin slurry layer consisting of 54–58% of kaolin, 25–29% of quartz, 15–18% of feldspar, 2–3% of calcium carbonate, 1–2% of talc, and remainder of water. The form is then dried in air and subsequently fired at a temperature of 1000° C.–1150° C. for 48 hours. The resulting sleeve is resistant to a high temperature, not destroyed when subjected to a water quenching, prevents oxidation due to the high temperature produced by melting of the alloy material, and it ensures maintaining the size and shape of the blank.

Figure 9A:
FIGS. 9, 10 and 11 show various forms of blanks which may be manufactured by the method of the invention. In each figure the view marked "a" is a side elevation and the view marked "b" is an end elevation of an individual blank.
Figure 9B:
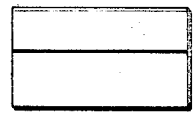
Figure 10A:
Figure 10B:
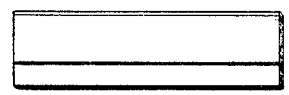
Figure 11A:
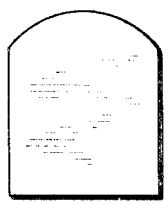
Figure 11B:

The sleeve or sheath 3 for holding the blank therein can be formed into a suitable shape so as to obtain various shapes of the blanks as shown in FIGS. 9, 10, 11. FIGS. 9 and 10 show blanks for production of magnets for use in a magneto-generator and FIG. 11 shows a blank for production of a magnet for use in meters such as voltmeter, ammeter, etc. The supporting vessels for the blanks shown in FIGS. 9, 10, 11 can be made of the above-mentioned compositions, so that a blank having a highly improved property and a shape as shown in FIGS. 9, 10, 11 can be manufactured by means of the supporting vessels.

As above mentioned, the magnetizable alloy blanks have to be remelted so that it is desirable to use a supporting enclosure such as the non-magnetic sleeve 13 shown in FIG. 5. The supporting means would be circular in cross section in manufacturing magnets for use in a loudspeaker, rectangular in manufacturing magnets for use in an electric meter, and semi-circular in case of manufacturing magnets for use in a flywheel. Such specially-shaped structures may easily be manufactured by a conventional means, and form no part of the present invention.

It will be understood that the remelting and subsequent quenching are to be conducted so as to maximize the crystal growth in the desired direction, that is, vertically with respect to the level of the cooling medium.

The invention is illustrated in the following examples:

EXAMPLE I

In this embodiment, the method according to the invention is directed to manufacturing a magnet for a loudspeaker, which is 20 mm. in diameter and 15 mm. in height. These dimensions are for the magnet after it has been ground in the finishing operation, so that the original casting is 20.5 mm. in diameter and 16.5 mm. in height.

A number of such blanks which have been cast of "permanent magnet" alloy by a conventional method are inserted in a sleeve of ceramic material having a thickness of 3–5 mm. and a length of 35 mm. The inner diameter of this sleeve is about 20.5–21 mm., just enough to accommodate the blanks.

The method in accordance with the invention is carried out using the arrangement shown in FIG. 5. A coil of 35 mm. diameter is mounted a distance $h$ of 77 mm. above the level of a cooling water bath at a temperature of about 25° C. A current of frequency 380 kc./sec, 200–300 amps is passed through the coil at a voltage across the coil of 150 volts. The blank-containing sheath is lowered at a speed of 10 mm./min. through the heat area defined by the energized coil. Zones in each blank are progressively melted and quenched by immersion vertically in the cooling water. Heat flows in the blank in a direction perpendicular to the water level. Thus a columnar crystal structure substantially 100% in parallel with the axis of the blank is produced. The sleeve and contents are removed from the water tank, the sleeve is broken and the magnetizable blanks are separated. Each of these blanks shows columnar crystal oriented completely in parallel with the longitudinal axis thereof as shown in FIG. 3. The transverse section of the blank thus obtained shows a bar-shaped crystal structure without a tortoise shell appearance and thus a completely anisotropic crystalline blank is produced.

EXAMPLE II

The procedure of Example I was repeated using blanks of different diameter. Magnetizable blanks of 14 mm. diameter and 40 mm. diameter were treated in accordance with the invention and subsequently magnetized to form magnets for loudspeakers. It was found that to obtain the most improved magnetic properties in the final magnets the optimum operating conditions for the method of the invention were:

| Diameter (mm.) | $h$ (mm.) | Descending speed (mm./min.) |
| --- | --- | --- |
| 14 | 65 | 13 |
| 40 | 100 | 6 |

The optimum operating conditions for blanks of other diameters may be determined by reference to FIG. 7.

EXAMPLE III

Four sample blanks were produced by melting in a furnace heated by a current having a frequency of the order of 1 kc./sec, casting into a mold and quenching at 1250° C. for 10 minutes. Blanks $A_1$ and $A_2$ were composed of an alloy consisting of 14.5% Ni, 25% Co, 8.0% Al, 3% Cu, 0.6% Si, remainder Fe.

Blanks $A_3$ and $A_4$ were composed of an alloy consisting of 14.5% Ni, 35% Co, 8.0% Al, 3% Cu, 4.5% Ti, 1.0% Si, remainder Fe.

Blanks $A_2$ and $A_4$ were treated by the method according to the present invention. All four blanks were then subjected to conventional magnetization including cooling in a magetic field and tempering at 600° C. for 2 hours.

FIG. 12 shows the BH curves of the four blanks. The values of Br, Hc and $(BH)_{max}$ for $A_1$, $A_2$, $A_3$ and $A_4$ are as follows:

| | Br (G) | Hc (Oe.) | $(BH)_{max}$ | (G.Oe.) |
| --- | --- | --- | --- | --- |
| $A_1$ | 12,500–13,500 | 610–650 | $5.5 \times 10^6$ | $6.0 \times 10^6$ |
| $A_2$ | 13,400–13,900 | 730–780 | $7.1 \times 10^6$ | $8.1 \times 10^6$ |
| $A_3$ | 8,000–8,300 | 1,200–1,350 | $3.8 \times 10^6$ | $4.3 \times 10^6$ |
| $A_4$ | 10,000–11,000 | 1,300–1,450 | $7.7 \times 10^6$ | $8.1 \times 10^6$ |

As can be seen from the above data, the method according to the invention ensures a remarkable improvement in the magnetic property of the magnet and renders it possible to manufacture on an industrial scale and at less expense magnets having values for the magnetic properties which have heretofore been obtainable only as laboratory specimens.

EXAMPLE IV

A Permalloy containing 50 parts of iron and 50 parts of nickel is heated in an induction furnace energized by a current having a frequency of 1 kc./sec. and the molten alloy is cast in a mold defined by a cylindrical pipe having an inside diameter of 25 mm. and made of the alumina-type material known as "Alundum." The alloy body together with the sheath of Alundum is passed downwardly through a heating coil as shown in FIG. 4. A high frequency current of 400 kilocycles per second is passed through the coil and thus the alloy body passing through the coil becomes heated in zones to a molten condition. The distance between the coil and the water level is determined so as to orientate the crystal structure to the greatest advantage. The alloy body is heated to such an extent that the original crystalline structure is destroyed and a recrystallized structure grows, which is orientated at right angles to the water level. The speed of lowering is about 15 mm. per minute. Thus a regular crystalline structure orientated in parallel with the axis of the cylindrical alloy body is produced. Subsequently, the alloy is placed in a magnetic field and cooled, thereby producing an anisotropic magnetic alloy having high permeability and complete crystalline structure which is orientated in parallel with the axis of the magnetic body.

FIGS. 13–18 show a comparison between an alloy body not treated in accordance with the invention and the alloy body prepared in accordance with this example. FIGS. 13–15 show an alloy body prepared from the same Permalloy as in this example, but omitting the treatment in accordance with the present invention. FIG. 13 is a microphotograph showing one quarter of the transverse section of the magnetizable alloy. The crystals grow in radial directions from the periphery towards the center of the casting, this being the representative crystalline structure which grows when a cylindrical metallic body is subjected to air cooling. FIG. 14 is a longitudinal sectional view showing the irregular crystalline structure. FIG. 15 shows an enlarged sectional view in which the Y-shaped boundary between the crystalline particles and the impurities irregularly distributed in dots can be seen. FIGS. 16–18 are microphotographs showing the magnetizable alloy prepared in the present example. FIG. 16 is its transverse section in which there are three column-shaped crystalline structures defined by the two boundaries consisting of crystalline particles. FIG. 17 is its longitudinal section which shows four large column-shaped crystalline structures arranged in parallel with the axis of the alloy body. If use is made of a sample 300 mm. in length, a crystalline column of 270 to 280 mm. in length can be obtained. The crystalline column comprises several single crystals combined together. A number of samples, each having a diameter of 25 mm. and comprising two to three crystalline columns have been produced on a mass production scale.

As can be seen from the microphotographs, the anisotropic character of the crystalline structure is 100%. Moreover, the impurities included in the alloy body are regularly aligned on one row. Two continuous dotted lines can be seen which show the impurities aligned on one straight line. This straight line corresponds to a magnetizable direction so that adverse influence due to the presence of the impurities is at a minimum.

BH curves of the alloy bodies described above with and without treatment in accordance with the invention are shown in FIG. 19. FIG. 19a shows a BH curve obtained from the body without treatment and FIG. 19b shows a BH curve obtained from the body which has been treated in accordance with the invention. The BH curve shown in FIG. 19a illustrates that magnetic saturation cannot occur until a magnetizing force of 160 oersted is applied. The rate of bending from the ascending branch portion to the horizontal saturation branch portion is not sharp. The coercive force is 8 oersted. The BH curve 1 shown in FIG. 19b becomes magnetically saturated at 80 oersted, i.e., one-half that of FIG. 19a. The coercive force is 4 oersted, i.e., again one-half that of FIG. 19a. The rate of bending from the ascending branch portion to the horizontal saturation branch portion is very sharp, thus forming a cubic BH curve.

The residual magnetism and the coercive force shown in the figure are resultant values including those of the yoke of the measuring instrument so that these measured values are not correct, but as there is no other means of measuring these values accurately, the above measuring method was adopted. Accordingly, the real residual magnetism would be higher than the above measured value and the real coercive force would be extremely small. However, for comparative purposes, the figures are sufficient to establish the advantage obtained by the use of the method in accordance with the invention. Thus a magnetizable alloy produced by the method of the invention may be applied to a hysteresis motor and other various types of radio equipment and instruments.

We claim:

1. A method of manufacturing a non-magnetized metal blank having an anisotropic crystalline structure suitable for subsequent magnetization which comprises progressively passing a blank of a metal from the group consisting of iron, cobalt, nickel and alloys thereof at constant speed under non-oxidizing conditions through an electromagnetic induction heating zone energized by an alternating current of frequency greater than 50 kilocycles per second to progressively heat and melt the said blank as it passes through said zone, and thereafter progressively quenching and cooling said blank unidirectionally from the lower end thereof by passing said melted blank into a body of cooling liquid whereby the resulting crystals of said metal are substantially completely unidirectionally oriented in said blank.

2. A method according to claim 1, wherein the current has a frequency within the range 150–600 kilocycles per second.

3. A method according to claim 2, wherein the blank is passed downwardly through the induction heating zone at a speed of not greater than 20 millimeters per second.

4. A method according to claim 2, wherein the blank passes from the induction heating zone to the surface of the cooling liquid a distance in the range $(D+47)$ millimeters to $(D+67)$ millimeters where D is the diameter of the blank in millimeters.

5. A method according to claim 1, wherein the said blank during passage through the induction heating zone has a molten zone having a vertical dimension in the range of 0.5D to 1.5D where D is the diameter of the blank in millimeters.

6. A method according to claim 1, wherein the cooling liquid is maintained at a temperature of less than 40° C.

7. The method of unidirectionally orienting the crystals of a magnetizable metal body which comprises enclosing said body within a non-magnetic ceramic sheath having a melting point greater than that of said metal passing said sheath and enclosed body progressively downwardly at constant speed through an electromagnetic induction heating zone energized with an alternating current of frequency greater than 50 kilocycles per second, thereby progressively heating and melting said body as it passes through said zone, and then passing said body and enclosing sheath at the same constant speed vertically downwardly into a body of cooling liquid disposed below and in proximity to said heating zone to progressively quench and cool said body thereby producing a recrystallized structure in said blank wherein the crystals are substantially completely vertically oriented.

8. A method according to claim 7, wherein a plurality of magnetizable blanks are vertically disposed in said retaining sheath, each blank having a coating of metal oxide film which inhibits fusion of the blanks during passage through the coil.

9. A method according to claim 2, wherein the blank includes alloying elements from the group consisting of silicon, aluminum, molybdenum, chromium and niobium.

10. A method according to claim 2, wherein the blank is of a material selected from the group consisting of 13–40% of cobalt, 10–20% of nickel, 0–3% of silicon, 6–13% of aluminum, 0–9% of copper, 0–8% of titanium, 0–5% of niobium, and the remainder iron.

11. A method according to claim 7, wherein the heated blank traverses a distance from the induction heating zone to the cooling liquid in the range $(D+47)$ millimeters to $(D+67)$ millimeters, wherein D is the diameter of the bank in millimeters.

12. A method according to claim 7, wherein the molten zone of said blank during passage through said induction heating zone has a vertical dimension in the range of 0.5D to 1.5D, wherein D is the diameter of the blank in millimeters.

13. A method according to claim 7, wherein the cooling liquid is maintained at a temperature of less than 40° C.

14. A method according to claim 7, wherein the current is within the frequency of the alternating current is within the 150–600 kilocycles per second.

15. A method according to claim 14 wherein said frequency is about 400 kilocycles per second.

16. A method according to claim 7, wherein the said speed is not greater than 20 millimeters per minute.

17. A method according to claim 7, wherein a blank having a diameter D millimeters is passed downwardly through an inductive heating zone having a diameter in the range $(D+7)$ millimeters to $(D+27)$ millimeters.

References Cited

UNITED STATES PATENTS

| 2,323,944 | 7/1943 | Snoek | 148—103 X |
| 2,578,407 | 12/1952 | Ebeling | 148—103 |
| 2,862,287 | 12/1958 | Koch | 29—607 |
| 3,085,036 | 4/1963 | Steinort | 75—123 X |

FOREIGN PATENTS

| 621,413 | 4/1949 | Great Britain. |
| 552,860 | 2/1958 | Canada. |
| 614,788 | 12/1948 | Great Britain. |

OTHER REFERENCES

Walton, D.: The Origin of the Preferred Orientation in the Columnar Zone of Ingots. In Transactions of The Metallurgical Society of AIME. Vol. 215, pp. 447–456, June 1959.

HYLAND BIZOT, Primary Examiner

J. E. LEGRU, Assistant Examiner

U.S. Cl. X.R.

75—65; 148—31.57, 108; 164—54